US012687937B2

(12) United States Patent
Bernasch et al.

(10) Patent No.: US 12,687,937 B2
(45) Date of Patent: Jul. 21, 2026

(54) ADJUSTMENT SYSTEM FOR HINGED MOUSE WRIST RESTS

(71) Applicants: Timothy Frank Bernasch, St Catharines (CA); Ahmed Omar, Toronto (CA)

(72) Inventors: Timothy Frank Bernasch, St Catharines (CA); Ahmed Omar, Toronto (CA)

( * ) Notice: Subject to any disclaimer, the term of this patent is extended or adjusted under 35 U.S.C. 154(b) by 0 days.

(21) Appl. No.: 18/974,799

(22) Filed: Dec. 10, 2024

(65) Prior Publication Data

US 2025/0190062 A1 Jun. 12, 2025

Related U.S. Application Data

(60) Provisional application No. 63/608,696, filed on Dec. 11, 2023.

(51) Int. Cl.
　　*G06F 3/0354* (2013.01)
　　*G06F 3/039* (2013.01)
(52) U.S. Cl.
　　CPC .......... *G06F 3/03543* (2013.01); *G06F 3/039* (2013.01)
(58) Field of Classification Search
　　CPC ................................... G06F 3/03543

USPC .......................................... 345/163
See application file for complete search history.

(56) References Cited

U.S. PATENT DOCUMENTS

| | | | |
|---|---|---|---|
| 5,433,407 A | 7/1995 | Rice | |
| 6,396,478 B1 * | 5/2002 | Kravtin | G06F 3/03543 |
| | | | 248/118.1 |
| 8,451,225 B2 | 5/2013 | Loomis | |
| 8,998,153 B2 | 4/2015 | Lucas | |
| 9,927,890 B1 * | 3/2018 | Perlman | G06F 3/03543 |
| 2003/0169236 A1 | 9/2003 | Crocker | |
| 2004/0169640 A1 * | 9/2004 | Chao | G06F 3/03543 |
| | | | 345/163 |

* cited by examiner

*Primary Examiner* — Long D Pham

(57) ABSTRACT

A computer mouse device includes a body containing electronic circuits configured to control a cursor on a computing device, a rigid linkage, and a wrist support. The body includes a bottom surface configured to be used on a horizontal surface and a notch formed into the bottom surface. The rigid linkage has a first end and a second end. The first end of the rigid linkage is coupled to the body via the notch and the second end of the rigid linkage is coupled to the wrist support. The notch has a first plurality of indentations configured to receive the first end of the rigid linkage.

13 Claims, 11 Drawing Sheets

105 A

105

301

ADJUSTMENT SYSTEM FOR HINGED MOUSE WRIST RESTS

BACKGROUND

This invention relates to computer mice and specifically to ones which include a rest for the wrist or palm. Many video game players wish to play video games on PC computer hardware instead of consoles, which means they must use a mouse for many hours continuously. This can cause wrist strain or even injury when the position of the wrist or palm is not relaxed. There are many hundreds of examples of wrist or palm rest devices intended to help ease wrist strain while using a computer mouse. However, none of them address the specific issues of professional or even casual computer gaming. Gamers need to be able to make very fast movements, also very long movements, and they also need to be able to lift the mouse up to re-center it, many times per minute.

Most designs of the past have been devices that sit on a table top surface have the disadvantage of being stationary and not coupled to the mouse. When the mouse is moved, the wrist or palm rest part gets closer or farther away and it does not support the wrist or palm as well. The constant friction can also cause irritation. Furthermore, it is a physical barrier to the mouse. There is only a small "sweet spot" where the wrist rest performs ergonomically and in other positions it does not work well.

Encircling the wrist or palm with a strap can cause perspiration and irritation and also the bracelet may interfere with other activities like using a keyboard. Also, users who wear a wristwatch may have to remove it to use the mouse rest which is a large disadvantage, especially as smart watches become more popular.

"Floating" designs have the disadvantage is that it is very easy for it to move out of the correct position since it is literally not attached to anything. It is actually very easy for it to move out of position when making quick movements in opposite directions. This type of support might be suitable for light word processing-where movements are slow and the timing between them does not matter much. For gaming, however, they are unsuitable since there is no time to fuss with the position or retrieve a lost rest during a game.

Some video game players prefer to set their mouse movement sensitivity (also known as dots per linear inch or "DPI") and in-game sensitivity as low as possible. The DPI number describes the number of pixels the cursor moves for every inch the mouse moves. When the number is low, it increases the precision when making very small movements in the game.

Sometimes the on-screen cursor must move by only one or two screen pixels. When playing something that requires precise aiming, a sensitive mouse is not a good idea. With such a mouse, to aim properly requires more effort to precisely control the mouse. When quickly moving short distances, lower sensitivity can help to avoid 'overshooting' a target. Put another way, it is easier to move the mouse by exactly one pixel if it moves fewer pixels per inch. Lower sensitivity also smooths out the natural twitches and micro-adjustments humans can't help but make while playing. Given that each player has the skill to make some "shortest possible movement", dividing the DPI in half will also halve the size of the minimum movement, which instantly increases the 'resolution' of aiming without having to gain more skill through practice. However, there is a tradeoff-lowering DPI and in-game sensitivity also affects large movements. In general, all movements become physically longer paths on the mouse surface when DPI is lower. Sometimes a gamer might want to move the cursor across the entire screen while browsing menus or make some kind of movement in the game that is thousands of pixels high or wide. In this case the mouse must be moved a very long distance. The lower the sensitivity, the longer the distance, in practice such a movement at low DPI might be 12 inches from left to right to spin the character 180 degrees in a first-person shooter game, for example. Such a movement might be larger than the mouse surface or move off the edge—especially if the mouse did not start at the opposite edge of the mouse surface. This then requires the player to pick up the mouse just high enough to disable its tracking, transport it to a different area of the mouse surface, place it back down, and resume playing.

In practice, gamers or pro players using low DPI settings tend to break very long movements down into a series of shorter movements with very low lift. It is very important to the gamer to be able to lift the mouse, carry it to a new position, and resume playing as quickly as possible.

Holding a gaming mouse depends on personal preference and what game a gamer is playing. The way in which a mouse is held is called the 'grip'. While mice with an integrated wrist rest are designed to work with different grip styles, gamers may find that how they hold the mouse will influence how far back from the mouse the wrist rest needs to sit, so that they can use the mouse comfortably.

As such, there is a need for an improved type of wrist rest with an adjustable hinge that is attached in a way that allows the overall length to be changed while still able to operate as a hinge.

SUMMARY OF INVENTION

The invention relates to an ergonomic computer mouse device designed to enhance user comfort and reduce strain during prolonged use. In an embodiment of the invention, the device features a body with electronic circuits to control a cursor, a bottom surface adapted for use on a horizontal surface, and a notch integrated into the bottom surface. A rigid linkage connects the mouse body to a wrist support via a plurality of indentations in the notch, providing adjustable positioning and rotatable coupling to promote natural hand and wrist alignment.

The notch on the mouse body includes multiple indentations that engage with a pin and bearing assembly at the first end of the rigid linkage, allowing for adjustable and secure attachment. A detachable notch door provides access for adjustment of the wrist support position. The wrist support is coupled to the second end of the rigid linkage. The coupling of the mouse to the wrist rest via the rigid linkage and two hinge joints is designed for limited rotation along specific axes to maintain stability while accommodating user movement.

BRIEF DESCRIPTION OF DRAWINGS

Features shown in the drawings are meant as illustrative of only some embodiments, and not of all embodiments unless otherwise explicitly indicated.

DETAILED DESCRIPTION OF EMBODIMENTS

Figure 1:
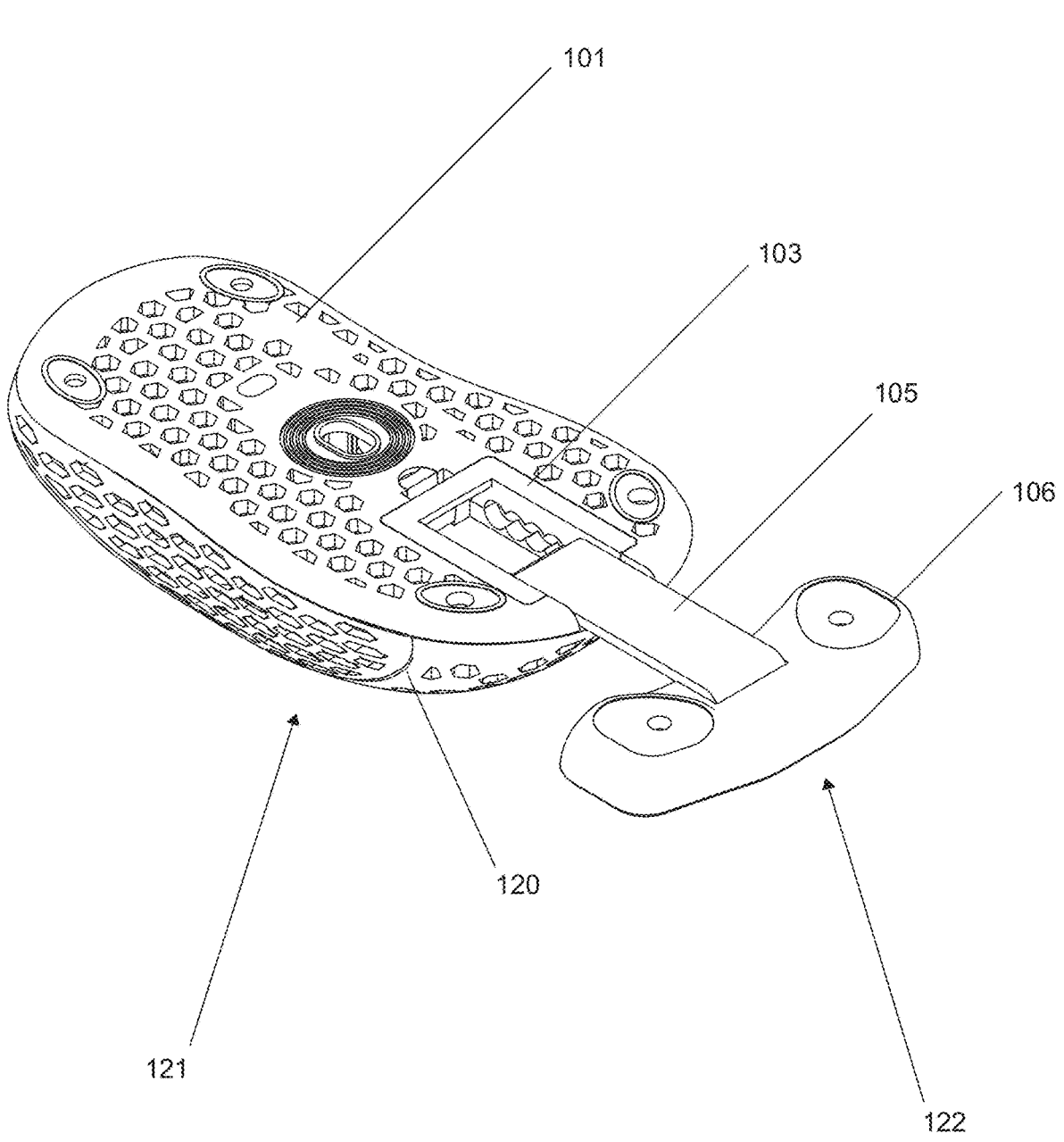
FIG. 1 shows a bottom view of a fully assembled mouse with adjustable hinged wrist rest attached, in accordance with an embodiment of the invention.

It will be readily understood that the components of the present embodiment(s), as generally described and illustrated in the Figures herein, may be arranged and designed in a wide variety of different configurations. Thus, the following detailed description of the embodiments of the apparatus of the present embodiment(s), as presented in the Figures, is not intended to limit the scope of the embodiment(s), as claimed, but is merely representative of selected embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description but is not intended to be exhaustive or limited to the embodiment(s) in the form disclosed. Many modifications and variations will be apparent to those of ordinary skill in the art without departing from the scope and spirit of the embodiment(s). The embodiment was chosen and described in order to best explain the principles and the practical application, and to enable others of ordinary skill in the art to understand the embodiment(s) for various embodiments with various modifications as are suited to the particular use contemplated.

FIGS. 1-4 show a mouse with a hinged wrist wrest that is adjustable. To change the total length of the wrist rest to accommodate different people and different mouse grips, the hinge can be disassembled and repositioned. On the bottom surface of the mouse (101) there is a notch (220) with a removable door (103) which serves to cover and retain the first end (105A) of the hinge link (105). The removable door (103) is attached to the mouse body by a first clip junction (222) at the front end of the removable door (250), and a second clip junction (227) at the rear end of the removable door (251). A spring tab (205) on the front end of the door (103) engages a first clip junction (222) which is in the front wall (223) of the notch (220). The door (103) can be removed by unclipping the spring tab (205) from the first clip junction (222) with the aid of a small indentation (102) for a tool like a screwdriver or fingernail. Removing the door (103) will allow the hinge link (105) to be moved to engage a different indentation of the plurality of indentations (202) which will change the distance between the mouse body (120) and the wrist rest (122).

The bottom surface (101) of the mouse is commonly known in the art to be placed on a surface such as a desktop or tabletop or mouse pad in order to operate the mouse to control a computing device. A first hinge joint made between the first end of the hinge link (105A) and the mouse body (120) can rotate on one axis so that the movement of the mouse is perpendicular to the mouse operation surface. A second hinge joint formed by the second end of the hinge link (105B) rotates on the same perpendicular axis, the net result being that the mouse can be lifted straight up off of the mouse operation surface while the wrist rest remains in contact with it.

Figure 2:
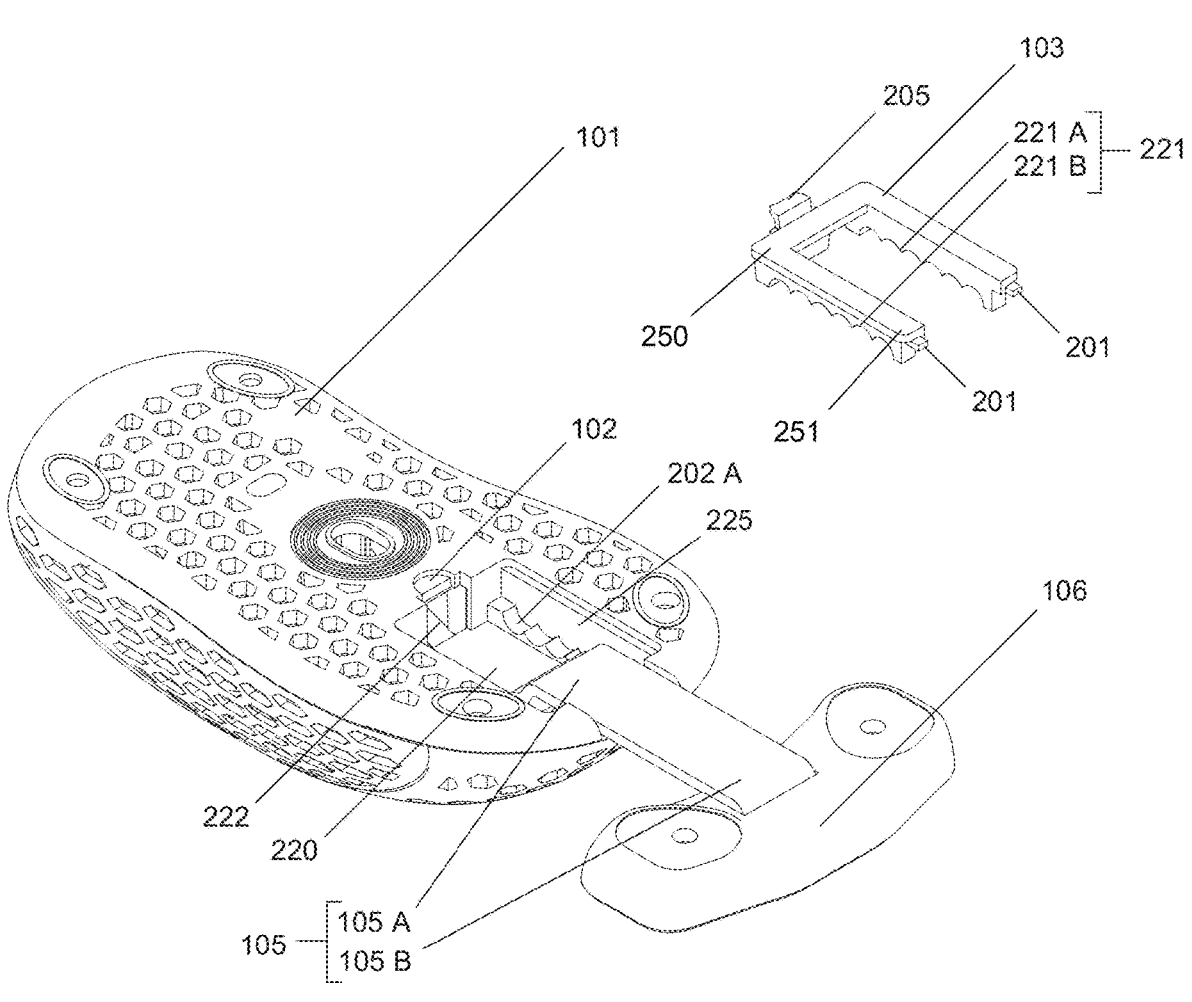
FIG. 2 shows a bottom view of the mouse with the notch door removed but the hinge linkage still in place, in accordance with an embodiment of the invention.

FIG. 2 shows the mouse with the removable door (103) opened. The door (103) is held in place with slot and tab junctions on the front and back end, the first tab (205) engaging with a first clip junction (222) on the front wall (223) of the notch (220) and another pair of tabs (201) on the rear end of the door (103) which engage a second clip junction (227) in the rear wall (224) of the notch (220).

Figure 3:
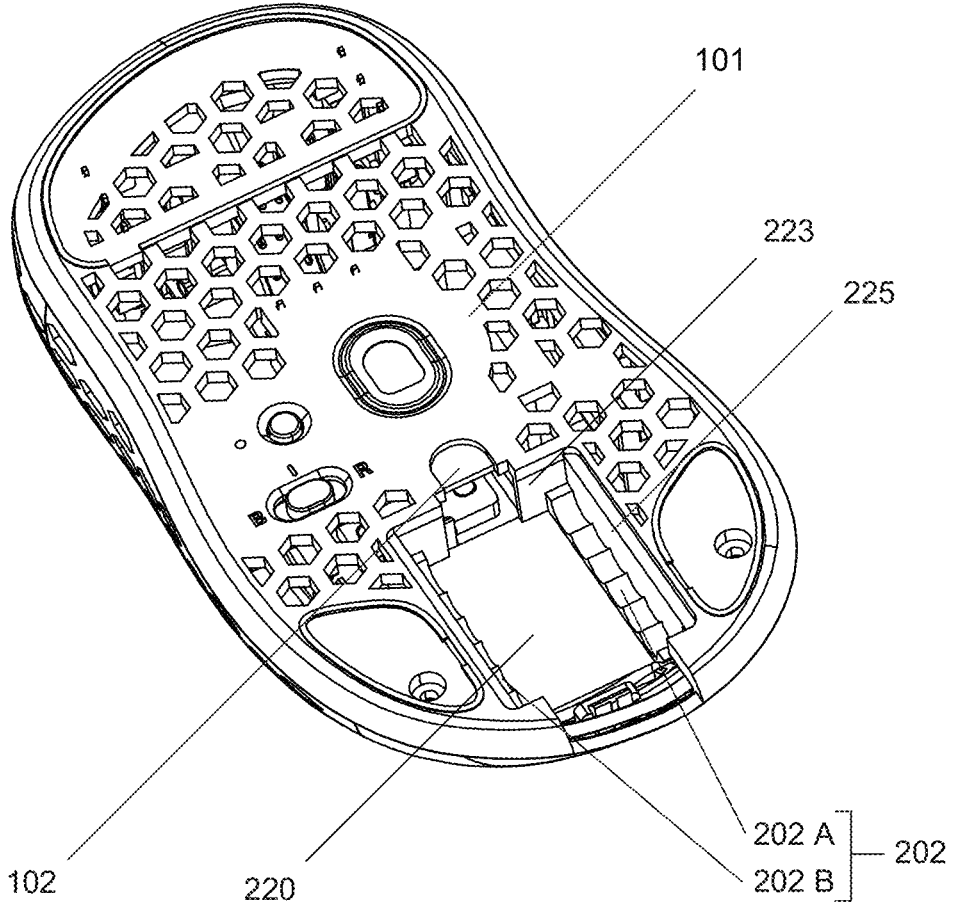
FIG. 3 shows a bottom view of the mouse with the notch door and the linkage removed, in accordance with an embodiment of the invention.

FIG. 3 is a detail of the notch (220) showing the front wall (223), and a first side wall (225). There is a plurality of indentations (202) in the notch, including a first set of indentations (202A) along the first wall and a second set of indentations (202B) along a second wall.

Figure 4:
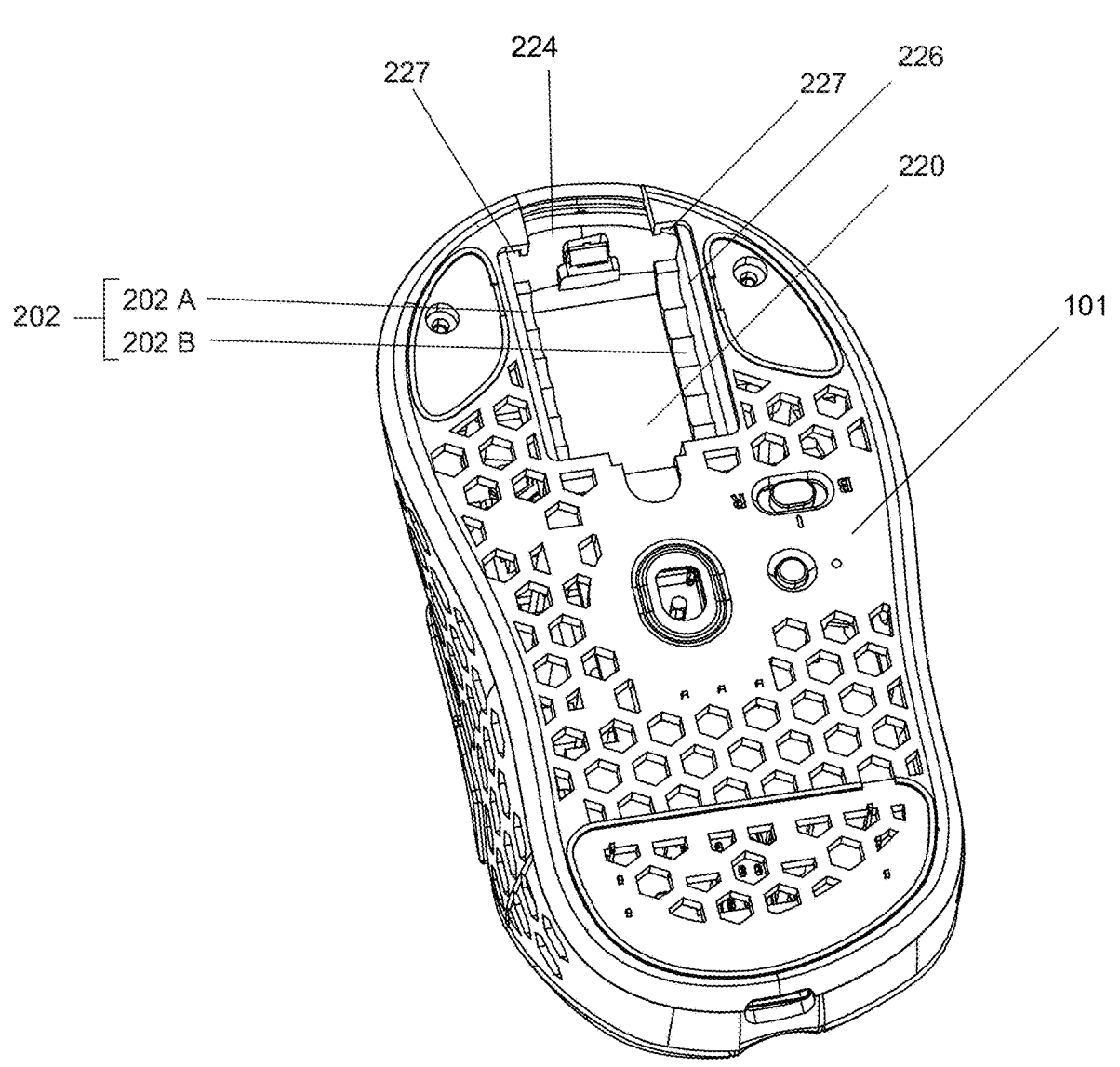
FIG. 4 shows a bottom view of the mouse with the notch door and linkage removed, in accordance with an embodiment of the invention.

FIG. 4 is a different angle of the notch (220) showing the second set of clip junctions (227) in the rear wall (224) which hold rear end of the door (103) by its rear tabs (201).

Figure 5:
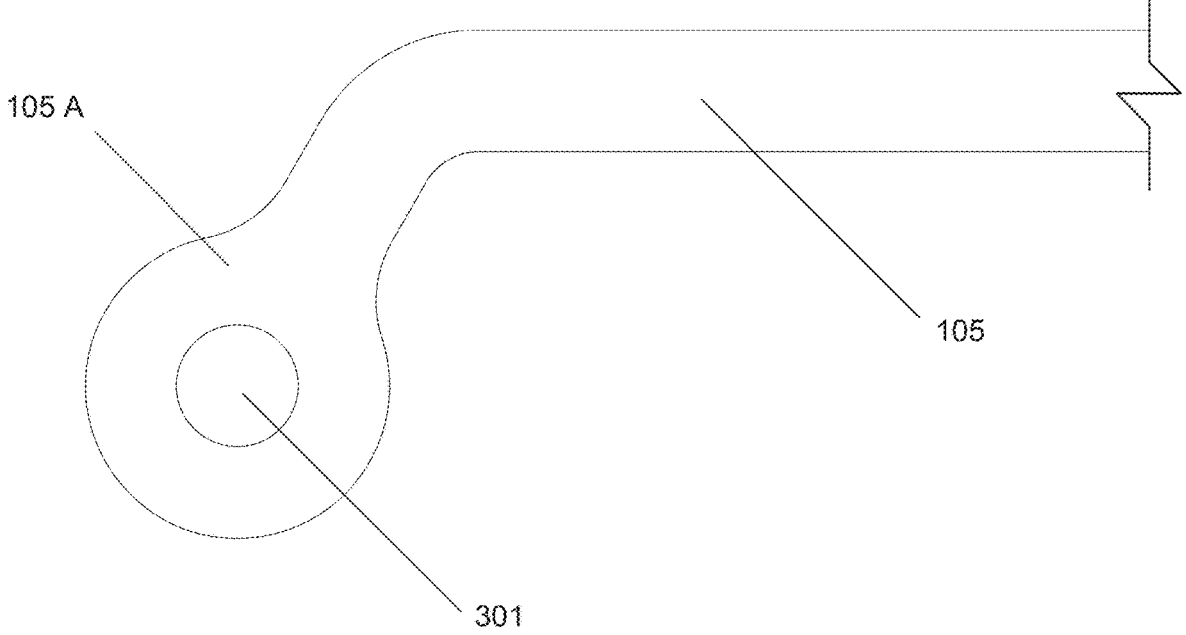
FIG. 5 shows a focused view of a hinge linkage that uses a pin and bearing, in accordance with an embodiment of the invention.

FIG. 5 is a detail of an embodiment of a hinge link (105) showing the first end (105A) end of the hinge link (105). In this side view a through-hole (301) that can receive a pin (401, 403) can be seen. The second end (105B) of the hinge link (105) is constructed the same as this first end (105A) shown in FIG. 5.

Figure 6:
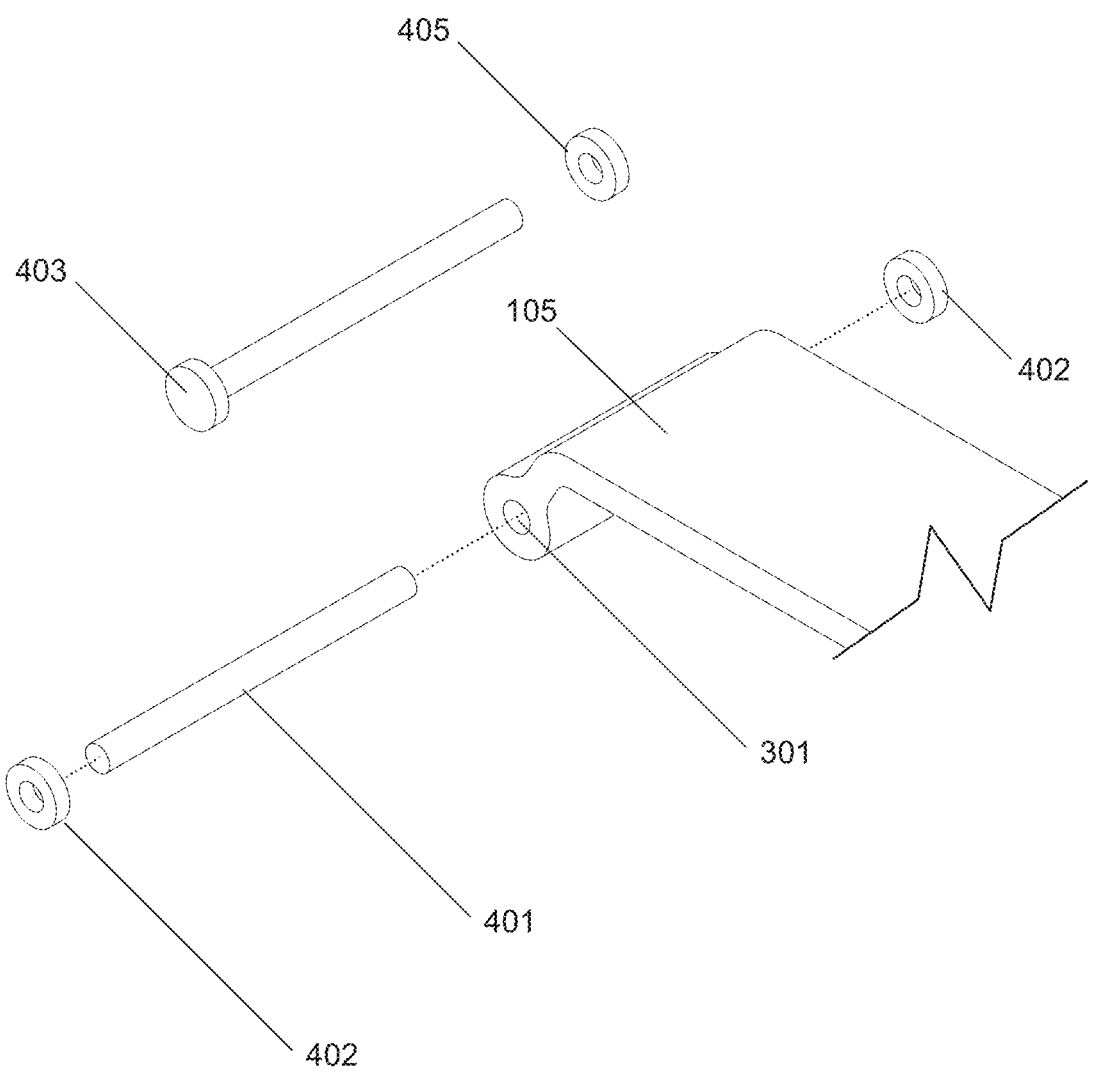
FIG. 6 shows a hinge assembly with pin, in accordance with an embodiment of the invention.

FIG. 6 shows ways to construct a bearing or bushing arrangement that allows the hinge link (105) to rotate on a single axis relative to the body of the mouse. In one embodiment, a pin with a bushing preformed into one end (403) is inserted into the through hole (301) of the hinge link (105), and another bushing (405) is fitted by friction onto the other end. These bushings engage the first and second set of the plurality of indentations (202) of the mouse. In another embodiment, a pair of ball bearings (402) are friction-fit onto the end of a pin (401) which is itself inserted into the through hole (301) in the hinge link. The second end (105B) of the hinge link (105) which rotates relative to the wrist rest (122) may also be constructed in a similar fashion as the first end (105A) of the hinge link (105).

Figure 7:
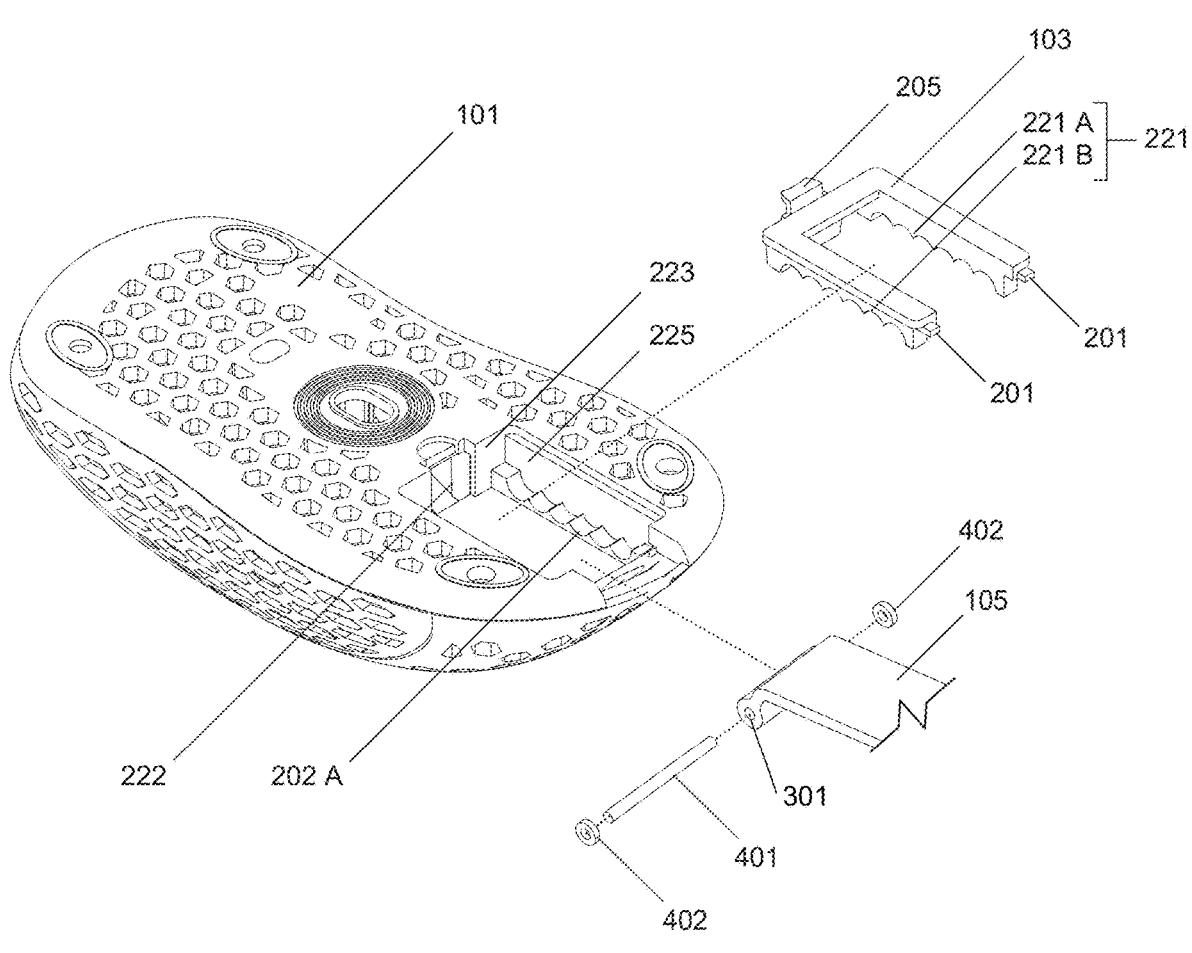
FIG. 7 shows an exploded view assembly of the mouse side of the hinge linkage, in accordance with an embodiment of the invention.

FIG. 7 shows the full assembly of the mouse and hinge link (105), including a door (103) which has a second plurality of indentations arranged in two sets (221) which receive the bearings (402) which are assembled onto the pin (401) that is inserted into the hole (301) of the hinge link (105). The first plurality of indentations (202) in the notch (220) act together with the second plurality of indentations (221) to fully enclose and retain the two bearings (402) of the hinge assembly. The notch door (103) is held in place by a front tab (205) engaging with the clip junction (222) in the front wall (223), and rear tabs (201) which engage with the rear clip junctions (227) on the rear wall (224).

Figure 8:
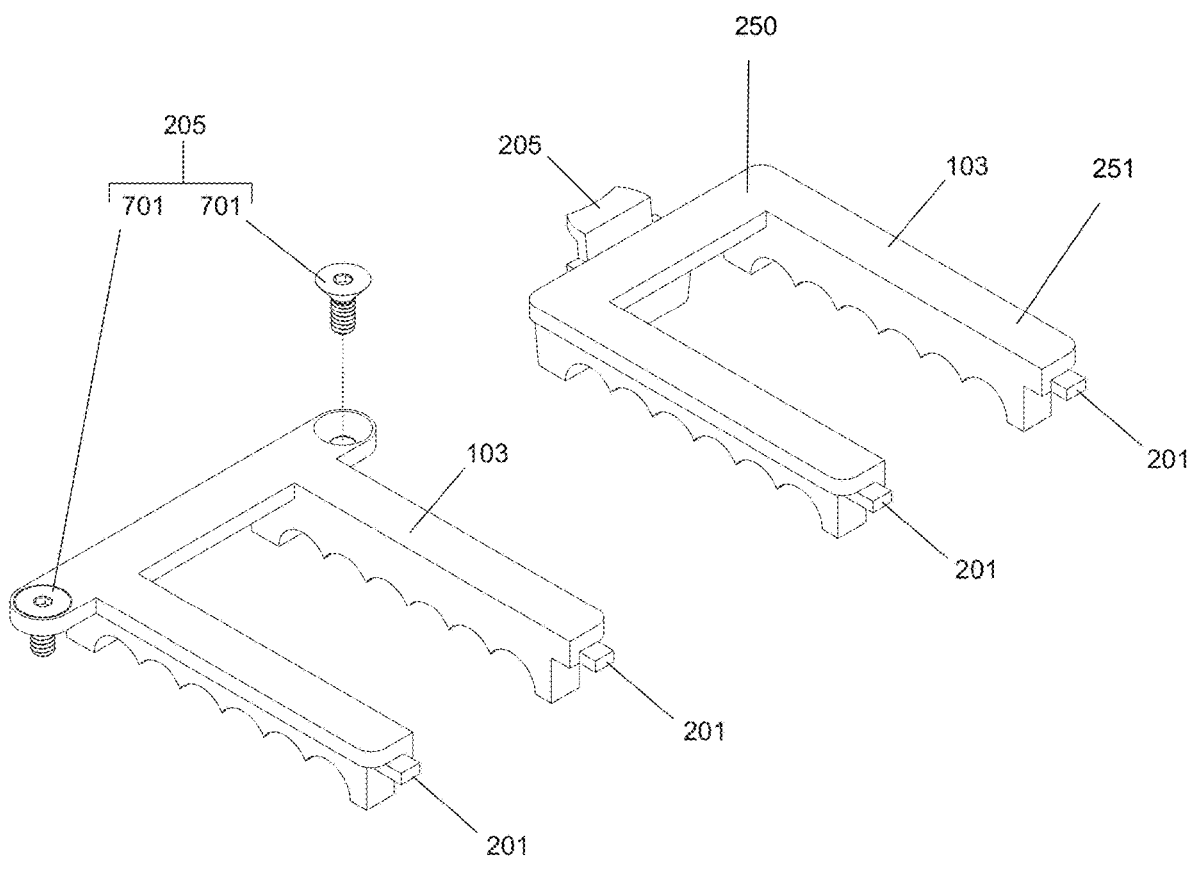
FIG. 8 shows a perspective view of various embodiments of the door, in accordance with an embodiment of the invention.

FIG. 8 shows an alternative embodiment to the notch door (103) which has one or more screws (701) which act as the clip (205) and engage with the bottom surface (101) of the mouse.

Figure 9:
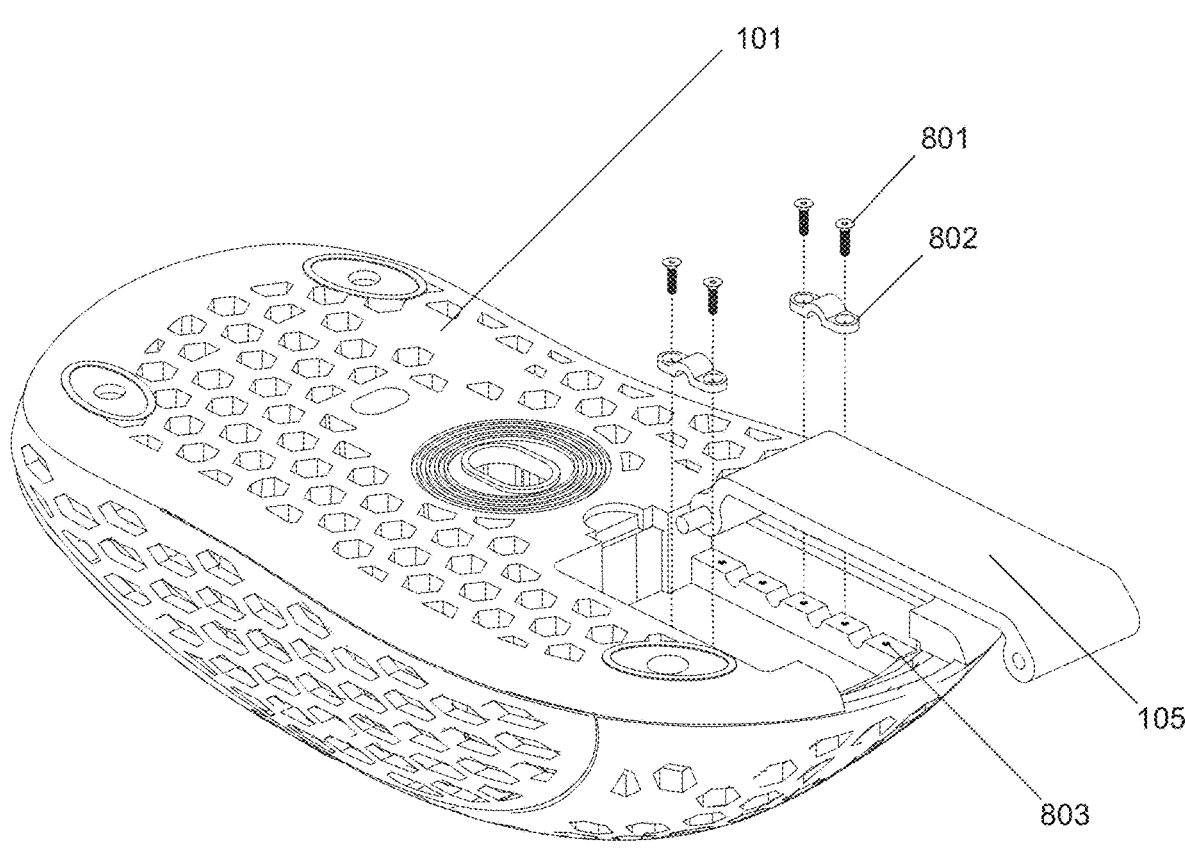
FIG. 9 shows a perspective bottom view of an assembly of the device, in accordance with an embodiment of the invention.

FIG. 9 shows an alternative method for retaining the hinge assembly which is a set of brackets (802) which are fixed onto the first plurality of indentations (202) by screws (801) which engage with holes (803) that are between each indentation in the first plurality of indentations (202). This method can allow the adjustment of the hinge link (105) position without the use of a notch door (103).

Figure 10:
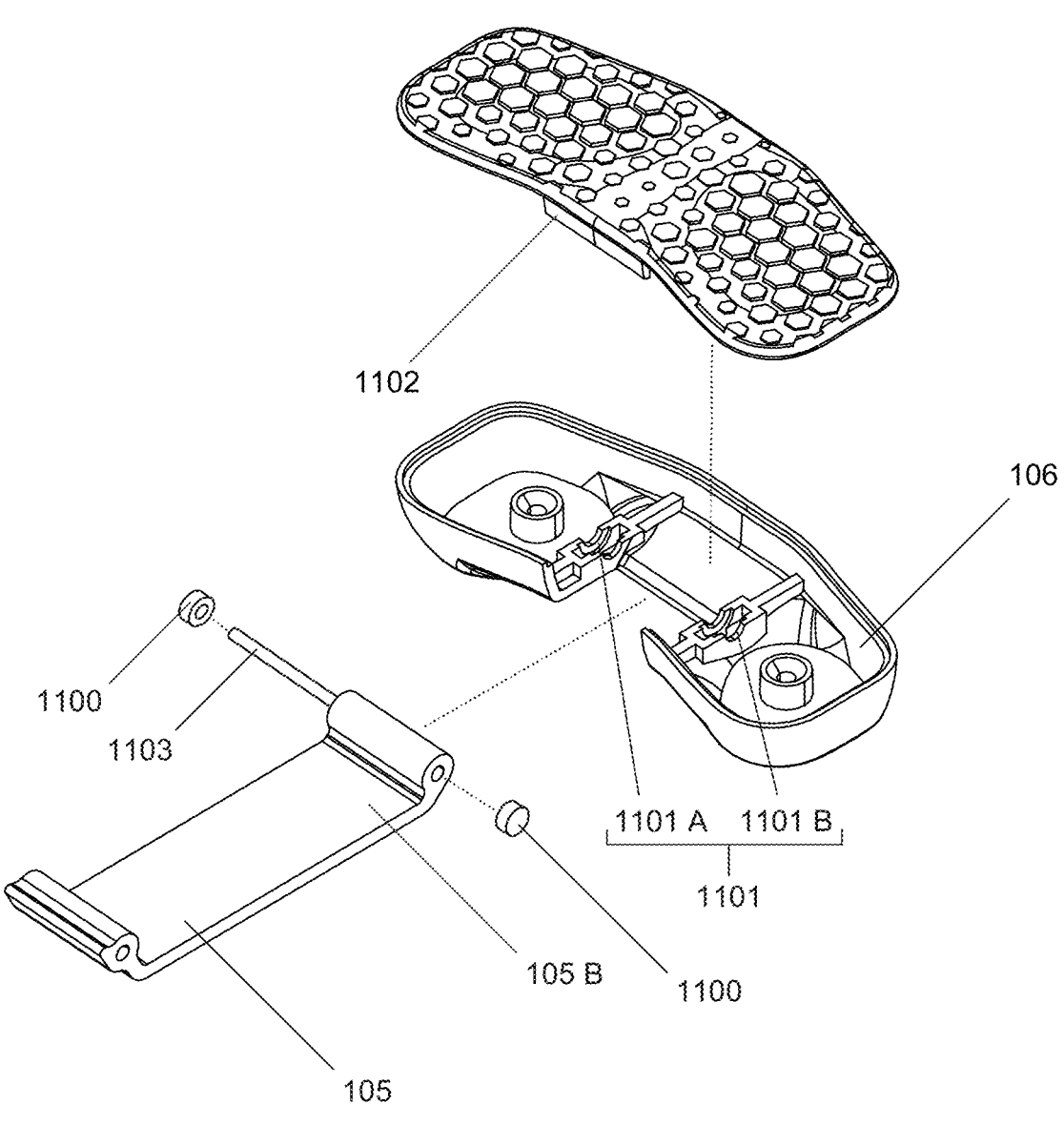
FIG. 10 shows unassembled components of the linkage and wrist rest, in accordance with an embodiment of the invention.

FIG. 10 shows the assembly of the wrist rest (122) of the mouse. A wrist rest (122 is formed by a bottom half (106) and a top half (1102), the bottom half (106) has a pair of indentations (1101) and the top half (1102) has a set of indentations (1104A, 1104B) which enclose and hold the bearings (1100) when they are assembled together. The bearings (1100) may be friction fit on either side of a pin (1103) which can be inserted through a hole in the second end (105B) of the hinge link (105). This forms a second hinge which can be rotated on a single axis.

Figure 11:
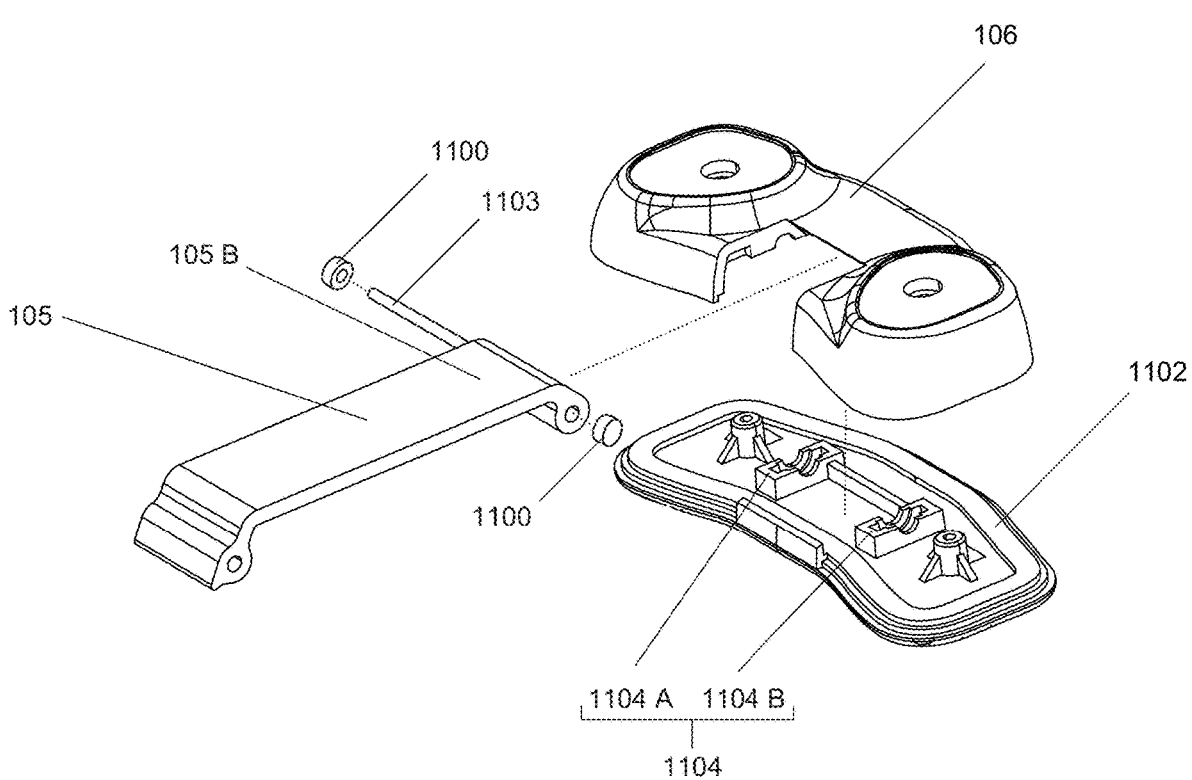
FIG. 11 shows a bottom view of the unassembled components of the linkage and wrist rest, in accordance with an embodiment of the invention.

FIG. 11 shows a bottom view of the wrist rest assembly which was just described. A set of indentations (1104) in the top half of the wrist rest (1102) that paired with the indentations (1101) in the bottom half (106) hold the bearings (1100) are visible in this view.

As depicted in FIGS. 1 and 2, an embodiment of the computer mouse device (121) includes a body (120) containing electronic circuits configured to control a cursor on a computing device, a rigid linkage (105), and a wrist support (122). The body (120) includes a bottom surface (101) configured to be used on a horizontal surface and a notch (220) formed into the bottom surface (101). The rigid linkage (105) has a first end (105A) and a second end (105B). The first end (105A) of the rigid linkage (105) is coupled to the body (120) via the notch (220) and the second end (105B) of the rigid linkage (105) is coupled to the wrist support (122). The notch (220) has a first plurality of indentations (202) configured to receive the first end (105A) of the rigid linkage (105).

The notch includes a front wall (223), a rear wall (2241), a first side wall (225) and a second side wall (226). The first side wall (225) includes a first set of indentations (202A) of the first plurality of indentations (202) while the second side wall (226) includes a second set of indentations (202B) of the first plurality of indentations (202). The front wall (223) includes a first clip junction (222) and the rear wall (224) includes a second pair of clip junctions (227).

In an embodiment of the invention, as shown in FIGS. 1, 2, 3, 4, and 7, the computer mouse device (121) includes a notch door (103) configured to be attached to the body (120) by engaging the first clip junction (222) and the second clip junction pair (227). As depicted in FIG. 8, one embodiment of the computer mouse device has a first clip junction (205) that includes one or more screws and a second clip junction pair (201) that is a slot and tab junction. In an alternative embodiment, the first clip junction (205) is a slot and tab junction, and the second clip junction pair (201) is a slot and tab junction. In addition, the notch door (103) may include a second plurality of indentations (221) configured to be on a corresponding opposite side of the plurality of indentations (202) of the notch (220) when the notch door (103) is attached to the body (120). The second plurality of indentations (221) are configured to receive the first end (105A) of the rigid linkage (105).

The second end (105B) of the rigid linkage (105) is rotatably coupled to the wrist support (122) which is composed of a bottom half (106) and a top half (1102). The rigid linkage (105) may be rotatable with respect to the wrist support (122) only along a second axis parallel to the first axis. As depicted in FIGS. 6, 7, 9, and 10, the first (105A) and second (105B) ends of the rigid linkage (105) are angled towards an upper side of the rigid linkage (105).

The notch door (103) may be detachable from the body (120) to provide access to the first end (105A) of the rigid linkage (105) and allow a user to adjust a relative position of the wrist support (122) to the body (120) by adjusting the position of the first end (105A) of the rigid linkage (105) on the plurality of indentations (202).

As depicted in FIG. 9, an embodiment of the computer mouse device (121) includes a pair of brackets (802) configured to be fastened to the first plurality of indentations (202) by fasteners (801), thereby locking the first end (105A) of the rigid linkage (105) into rotatable engagement with the first plurality of indentations (202).

It will be appreciated that, although specific embodiments have been described herein for purposes of illustration, various modifications may be made without departing from the spirit and scope of the invention. In particular, different metrics, hardware components, and virtual components may be used. Similarly, various types of services may be provided including delivery of goods. Additionally, the purchase of goods and/or materials that accompany the services disclosed herein is also possible via the tool. Accordingly, the scope of protection of this invention is limited only by the following claims and their equivalents.

We claim:

1. A computer mouse device comprising:
a body containing electronic circuits configured to control a cursor on a computing device, the body including a bottom surface configured to be used on a horizontal surface and a notch formed into the bottom surface;
a rigid linkage having a first end and a second end, the first end of the rigid linkage being coupled to the body via the notch; and
a wrist support coupled to the second end of the rigid linkage,
wherein the notch has a first plurality of indentations configured to receive the first end of the rigid linkage,
the first end of the rigid linkage includes a pin extending from lateral sides of the rigid linkage and configured to engage the first plurality of indentations such that the rigid linkage is rotatable relative to the body.

2. The computer mouse device of claim 1, wherein:
the notch includes a front wall, a rear wall, a first side wall and a second side wall,
the first side wall includes a first set of indentations of the first plurality of indentations,
the second side wall includes a second set of indentations of the first plurality of indentations,
the front wall includes a first clip junction, and
the rear wall includes a second clip junction.

3. The computer mouse device of claim 2, further comprising a notch door configured to be attached to the body by engaging the first clip junction and the second clip junction.

4. The computer mouse device of claim 3, wherein the first clip junction includes one or more screws and the second clip junction is a slot and tab junction.

5. The computer mouse device of claim 3, wherein the first clip junction is a slot and tab junction and the second clip junction is a slot and tab junction.

6. The computer mouse device of claim 3, wherein the notch door includes a second plurality of indentations configured to be on a corresponding opposite side of the plurality of indentations of the notch when the notch door is attached to the body, the second plurality of indentations being configured to receive the first end of the rigid linkage.

7. The computer mouse device of claim 6, wherein the notch door is detachable from the body to provide access to the first end of the rigid linkage and allow a user to adjust a relative position of the wrist support to the body by adjusting the position of the first end of the rigid linkage on the plurality of indentations.

8. The computer mouse device of claim 1, wherein the second end of the rigid linkage is rotatably coupled to the wrist support.

9. The computer mouse device of claim 8, wherein:
the rigid linkage is rotatable with respect to the body only along a first axis, and
the rigid linkage is rotatable with respect to the wrist support only along a second axis parallel to the first axis.

10. The computer mouse device of claim 8, further comprising a first pair of bearings coupled to the pin and configured to facilitate rotation of the first end of the rigid linkage relative to the body.

11. The computer mouse device of claim 10, further comprising a second pair of bearings coupled to the second end of the rigid linkage and configured to facilitate rotation of the second end of the rigid linkage relative to the wrist support.

12. The computer mouse device of claim 1, wherein the first and second ends of the rigid linkage are angled towards an upper side of the rigid linkage.

13. The computer mouse device of claim 1, further comprising a pair of brackets configured to be fastened to the first plurality of indentations and lock the first end of the rigid linkage into rotatable engagement with the first plurality of indentations.

* * * * *